US012620643B2

(12) United States Patent
Gratz et al.

(10) Patent No.: US 12,620,643 B2
(45) Date of Patent: May 5, 2026

(54) RECYCLING ALL SOLID-STATE BATTERIES (ASSBs) AND ANODE RECOVERY

(71) Applicant: Ascend Elements, Inc., Westborough, MA (US)

(72) Inventors: Eric Gratz, Worcester, MA (US); Yan Wang, Acton, MA (US)

(73) Assignee: Ascend Elements, Inc., Westborough, MA (US)

( * ) Notice: Subject to any disclaimer, the term of this patent is extended or adjusted under 35 U.S.C. 154(b) by 903 days.

(21) Appl. No.: 17/849,992

(22) Filed: Jun. 27, 2022

(65) Prior Publication Data

US 2022/0416325 A1     Dec. 29, 2022

Related U.S. Application Data

(60) Provisional application No. 63/215,410, filed on Jun. 25, 2021.

(51) Int. Cl.
  H01M 10/54 (2006.01)
  H01M 10/052 (2010.01)
  H01M 10/0562 (2010.01)
(52) U.S. Cl.
  CPC ......... H01M 10/54 (2013.01); H01M 10/052 (2013.01); H01M 10/0562 (2013.01); Y02W 30/84 (2015.05)
(58) Field of Classification Search
  None
  See application file for complete search history.

(56) References Cited

U.S. PATENT DOCUMENTS

| | | | | |
|---|---|---|---|---|
| 5,612,150 A | * | 3/1997 | Nishimura | ............ H01M 10/54 |
| | | | | 429/49 |
| 7,820,317 B2 | * | 10/2010 | Tedjar | .................... C22B 7/006 |
| | | | | 429/49 |
| 9,287,552 B2 | | 3/2016 | Sloop | |

FOREIGN PATENT DOCUMENTS

| | | | | |
|---|---|---|---|---|
| CN | 108470956 A | 8/2018 | | |
| CN | 109845008 A | 6/2019 | | |
| KR | 1020090077678 A | 7/2009 | | |
| WO | 2012035631 A1 | 3/2012 | | |
| WO | WO-2018218358 A1 | * | 12/2018 | ............ B02C 23/36 |

OTHER PUBLICATIONS

International Search Report, PCT/US2022/035079, Oct. 26, 2022, pp. 1-3.

* cited by examiner

*Primary Examiner* — Niki Bakhtiari
*Assistant Examiner* — Dustin Van Kirk
(74) *Attorney, Agent, or Firm* — Armis IP Law, LLC

(57)     ABSTRACT
A method for recycling All solid state batteries (ASSBs), the method including: receiving a recycling stream of ASSBs comprising an electrolyte comingled with at least one charge material; introducing a passivating substance for neutralizing an undesired reaction or discharge of the charge materials from the batteries defining the recycling stream; agitating the batteries in the recycling stream in the presence of the passivating substance for liberating the charge materials and electrolyte stored therein; and recovering the charge material and the electrolyte from the agitated batteries, and such that the passivating substance combines with the agitated batteries for generating a beneficial product thereby recycling ASSBs.

19 Claims, 7 Drawing Sheets

Cu Current Collector
Porous graphite or Si anode composite
Liquid electrolyte and porous separator layer
Porous cathode composite
Al Current Collector Cu Current Collector
Lithium & SSE anode / Dense graphite & SSE composite anode
Dense solid electrolyte layer
Dense cathode & electrolyte composite
Al Current Collector

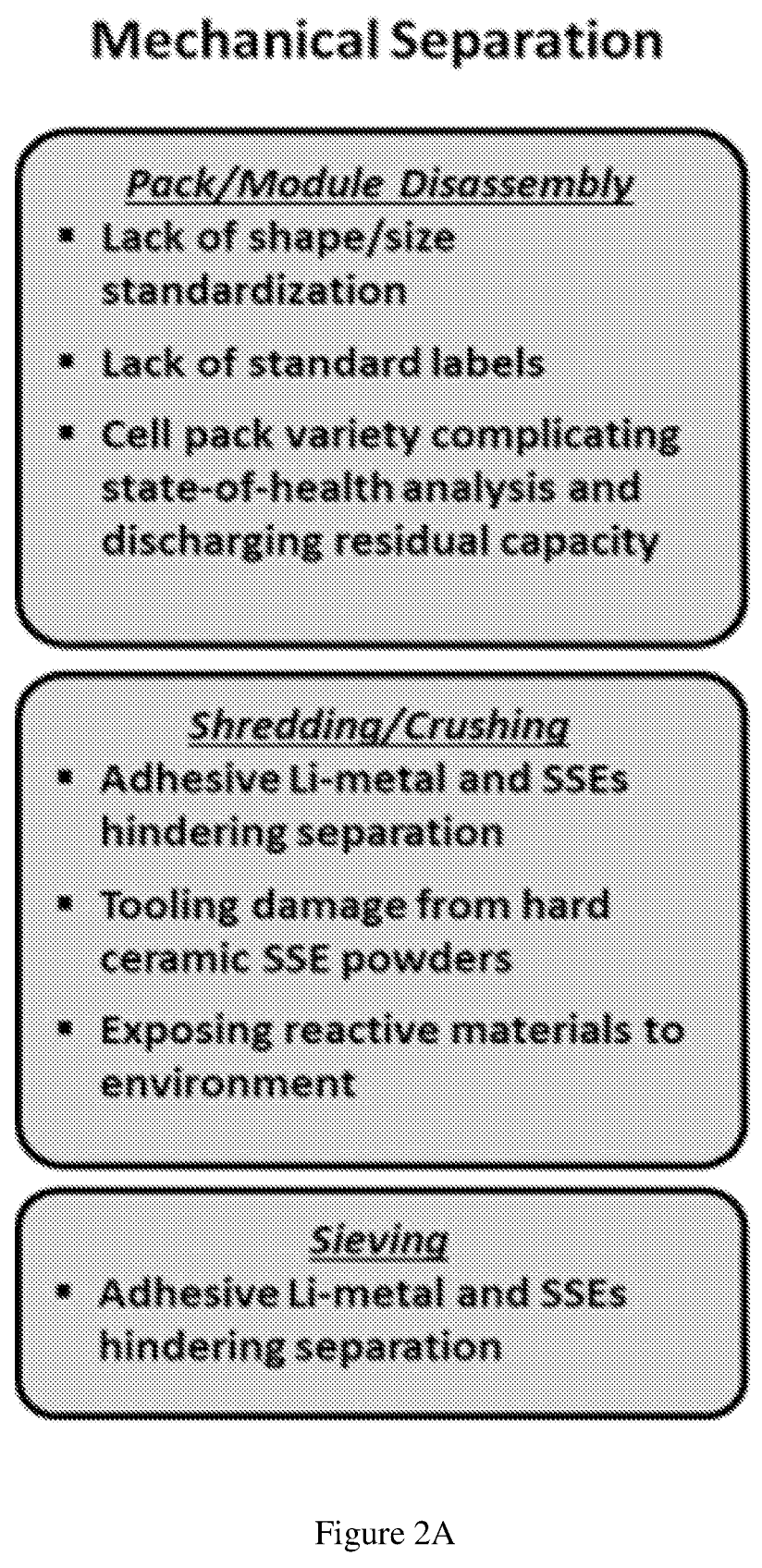

Mechanical Separation

*Pack/Module Disassembly*

* Lack of shape/size standardization

* Lack of standard labels

* Cell pack variety complicating state-of-health analysis and discharging residual capacity

*Shredding/Crushing*

* Adhesive Li-metal and SSEs hindering separation

* Tooling damage from hard ceramic SSE powders

* Exposing reactive materials to environment

*Sieving*

* Adhesive Li-metal and SSEs hindering separation

Figure 2A

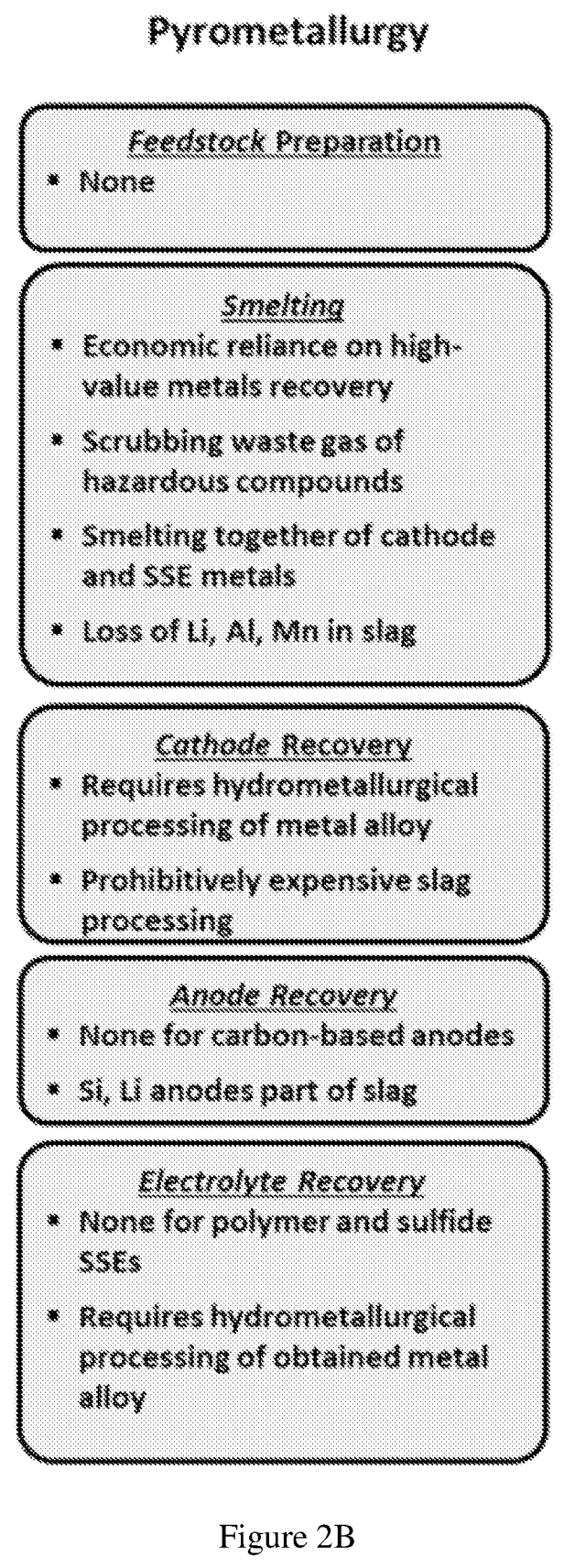

Pyrometallurgy

_Feedstock_ Preparation
* None

_Smelting_
* Economic reliance on high-value metals recovery
* Scrubbing waste gas of hazardous compounds
* Smelting together of cathode and SSE metals
* Loss of Li, Al, Mn in slag

_Cathode Recovery_
* Requires hydrometallurgical processing of metal alloy
* Prohibitively expensive slag processing

_Anode Recovery_
* None for carbon-based anodes
* Si, Li anodes part of slag

_Electrolyte Recovery_
* None for polymer and sulfide SSEs
* Requires hydrometallurgical processing of obtained metal alloy

Figure 2B

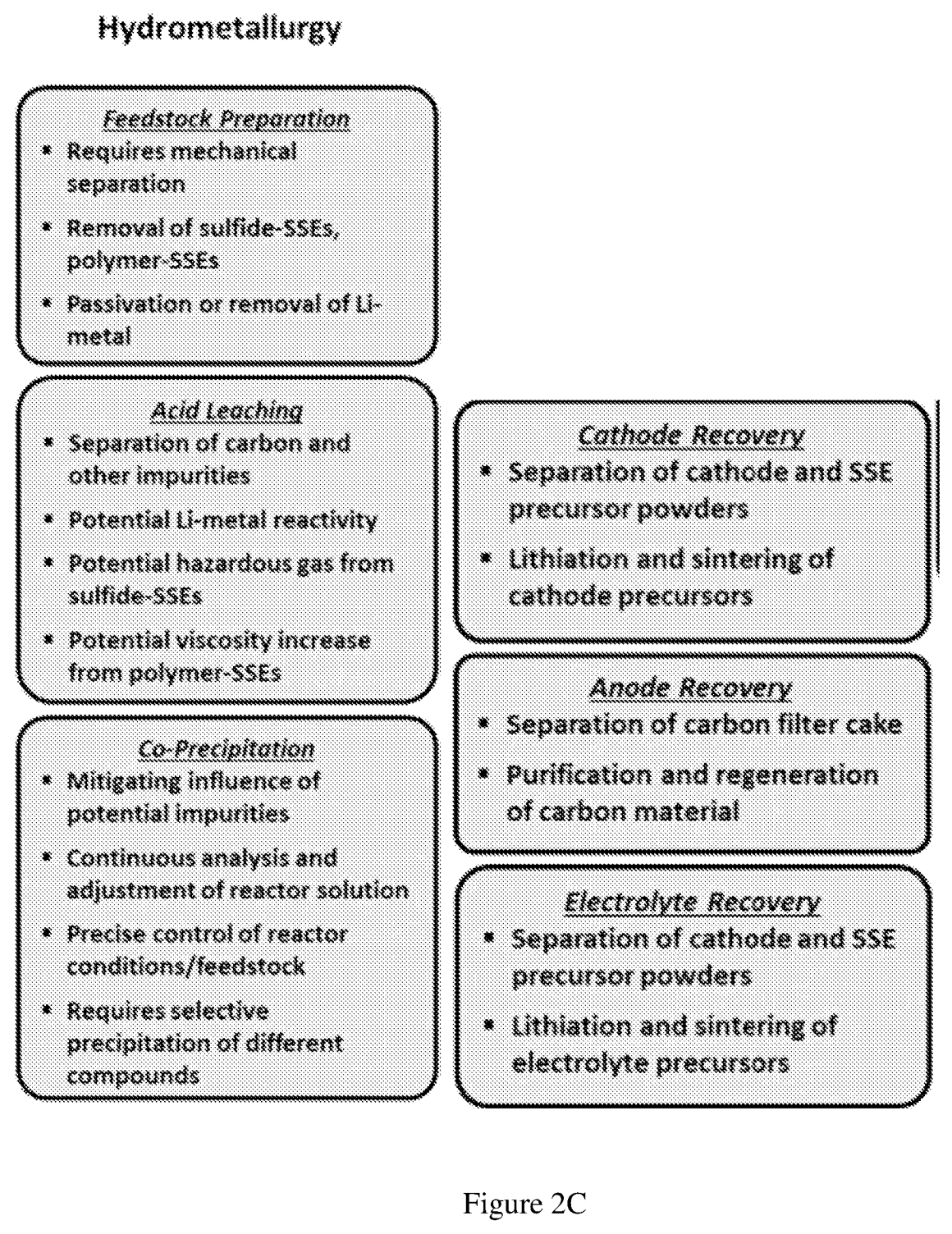

Hydrometallurgy

_Feedstock Preparation_
* Requires mechanical separation
* Removal of sulfide-SSEs, polymer-SSEs
* Passivation or removal of Li-metal

_Acid Leaching_
* Separation of carbon and other impurities
* Potential Li-metal reactivity
* Potential hazardous gas from sulfide-SSEs
* Potential viscosity increase from polymer-SSEs

_Co-Precipitation_
* Mitigating influence of potential impurities
* Continuous analysis and adjustment of reactor solution
* Precise control of reactor conditions/feedstock
* Requires selective precipitation of different compounds

_Cathode Recovery_
* Separation of cathode and SSE precursor powders
* Lithiation and sintering of cathode precursors

_Anode Recovery_
* Separation of carbon filter cake
* Purification and regeneration of carbon material

_Electrolyte Recovery_
* Separation of cathode and SSE precursor powders
* Lithiation and sintering of electrolyte precursors

Figure 2C

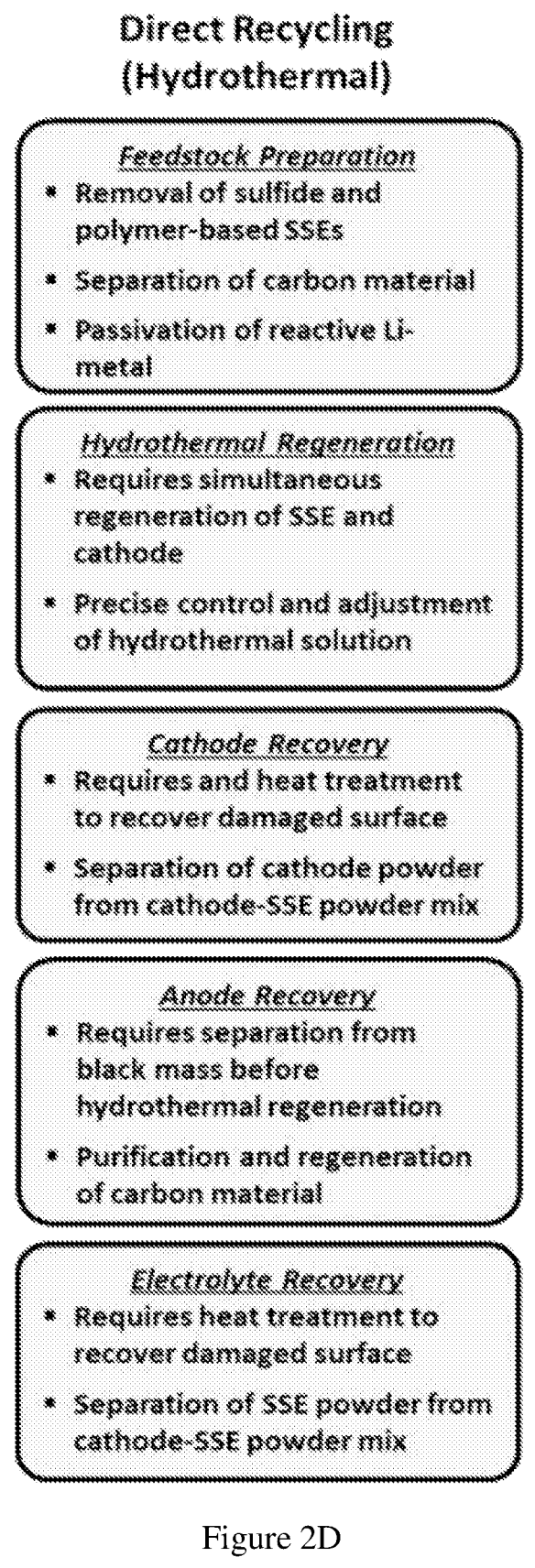

Direct Recycling (Hydrothermal)

_Feedstock Preparation_
* Removal of sulfide and polymer-based SSEs
* Separation of carbon material
* Passivation of reactive Li-metal

_Hydrothermal Regeneration_
* Requires simultaneous regeneration of SSE and cathode
* Precise control and adjustment of hydrothermal solution

_Cathode Recovery_
* Requires and heat treatment to recover damaged surface
* Separation of cathode powder from cathode-SSE powder mix

_Anode Recovery_
* Requires separation from black mass before hydrothermal regeneration
* Purification and regeneration of carbon material

_Electrolyte Recovery_
* Requires heat treatment to recover damaged surface
* Separation of SSE powder from cathode-SSE powder mix

Figure 2D

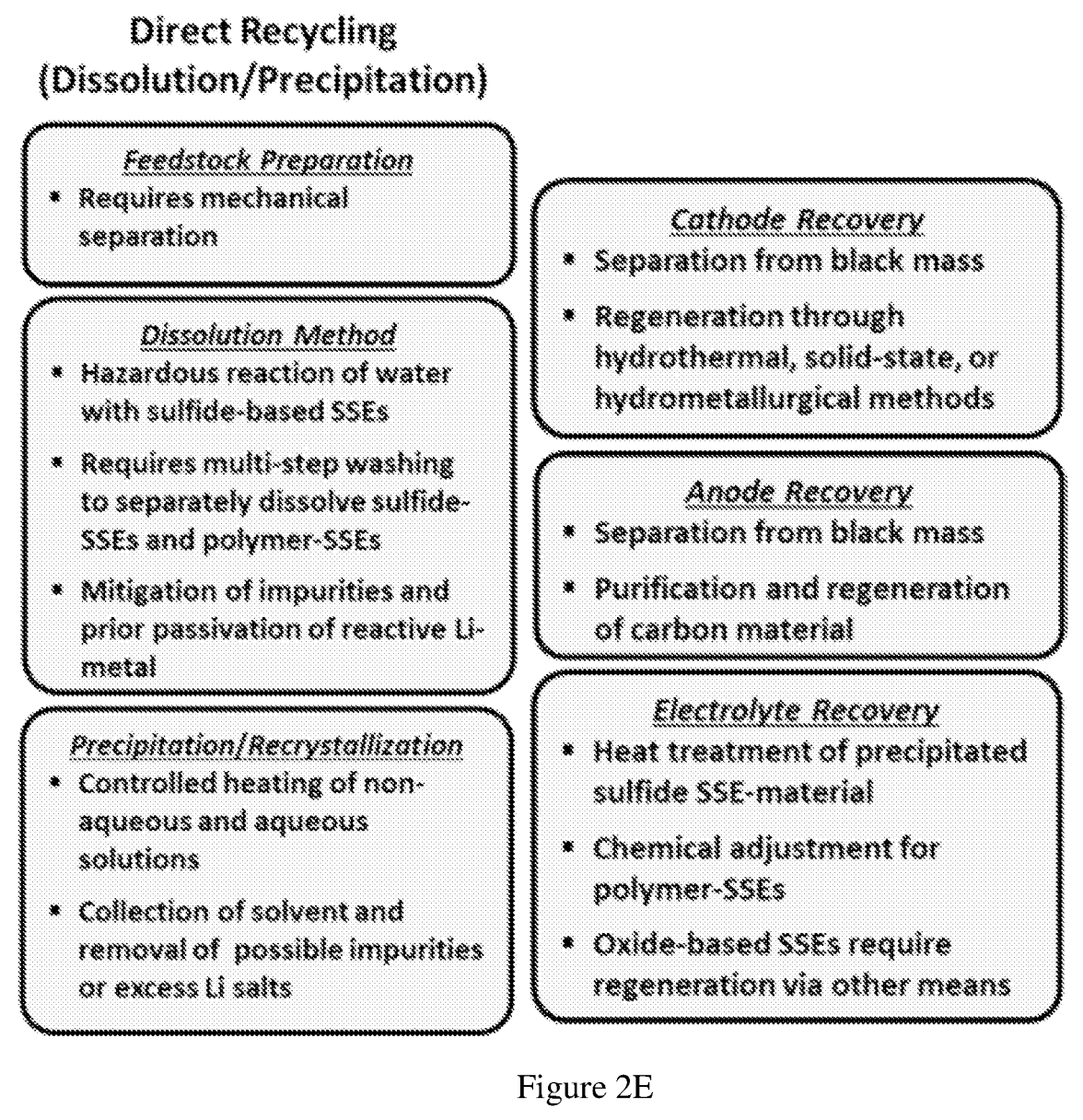

Direct Recycling
(Dissolution/Precipitation)

*Feedstock Preparation*
* Requires mechanical separation

*Dissolution Method*
* Hazardous reaction of water with sulfide-based SSEs
* Requires multi-step washing to separately dissolve sulfide-SSEs and polymer-SSEs
* Mitigation of impurities and prior passivation of reactive Li-metal

*Precipitation/Recrystallization*
* Controlled heating of non-aqueous and aqueous solutions
* Collection of solvent and removal of possible impurities or excess Li salts

*Cathode Recovery*
* Separation from black mass
* Regeneration through hydrothermal, solid-state, or hydrometallurgical methods

*Anode Recovery*
* Separation from black mass
* Purification and regeneration of carbon material

*Electrolyte Recovery*
* Heat treatment of precipitated sulfide SSE-material
* Chemical adjustment for polymer-SSEs
* Oxide-based SSEs require regeneration via other means

Figure 2E

RECYCLING ALL SOLID-STATE BATTERIES (ASSBs) AND ANODE RECOVERY

RELATED APPLICATIONS

This application claims the benefit of priority to U.S. provisional application No. 63/215,410 filed Jun. 25, 2021, having the title, "Recycling all solid-state batteries (AS-SBS)" by inventors, Eric Gratz and Yan Wang, which is hereby incorporated by reference herein in its entirety.

BACKGROUND

All solid-state batteries (ASSBs) are expected to represent a growth industry for lithium-ion batteries (LIBs). However, recycling aspects for ASSBs are underexplored and would be significant as supply/demand projections will eventually result in unprecedented amounts of disposed LIBs, especially from the automotive sector. The current state of LIB recycling is inadequate, and the incorporation of lithium-metal anodes and solid electrolyte chemistries in ASSBs will pose additional challenges. Therefore, recycling viability and waste management should have a guiding role in ASSB development toward commercialization.

Therefore, there is a need for novel methods for recycling ASSBs which are cost effective and economically viable for safe disposal of ASSBs, waste management, recovery of critical materials required for ASSBs and sustainable use of resources.

SUMMARY

Ever since their commercialization in the early 1990s, lithium-ion batteries (LIBs) have become an integral part of society. The electrochemical activity of lithium, combined with its low atomic mass and size, allows for superior advantages in energy and power density compared with other comparable battery chemistries. In the pursuit of better electrochemical performance, longevity, and safety for more demanding applications, it is expected that a significant portion of future LIBs will be composed of all solid-state batteries (ASSBs). ASSBs, contain a solid-state electrolyte (SSE) rather than a conventional non-aqueous liquid electrolyte. ASSBs demonstrate significant advantages over current LIBs and the mechanical integrity of the SSE can inhibit dendritic growth to various degrees, enabling the possibility of energy-dense lithium metal anodes. SSE chemistries generally provide superior thermal and electrochemical stability compared with LIBs with nonaqueous electrolytes, allowing for a wider voltage window. Therefore, SSE results in increased cell energy density, increased battery pack-specific and volumetric energy density by reducing the required amount of thermal management and cell support/housing infrastructure at the battery pack level, which can also make up 20% of the cost of an electric vehicle (EV) battery pack.

LIBs are used extensively for portable electronics and continue to find use for newly developing applications, such as electric vehicles, E-bikes, and grid storage in conjunction with alternative energy generation. The addition of these new markets with the continued growth of established markets projects for an exponential increase in demand for lithium and other materials critical in the manufacture of LIBs. Along with consideration of how industry can handle the required production, there must be consideration of the subsequent growth in waste generated as LIBs reach their end-of-life cycle and are discarded. The status quo is not sustainable due to the limited natural supply of critical materials, such as lithium and cobalt, and current end-of-life measures lack economically viable large-scale recycling systems for disposed LIBs. Currently adopted LIB recycling typically focuses on materials recovery of metals in the cathode with various degrees of efficiency and significant irrecoverable losses of electrolyte and lithium. Along with needed improvements in recovery yield, these processes are not yet economically viable and can either produce significant amounts of waste themselves or generate greenhouse gases. Lack of foresight in recycling, both in infrastructure and legislation, has led to only ~5% of possible LIBs being recycled in the USA. This is in significant contrast to lead-acid batteries, which are currently recycled and recovered at much higher rates—near 99%. Therefore, development into an economically viable and efficient system of recycling for next-generation LIBs is imperative. As ASSBs are still in the development phase and not yet in mass production, there is a significant opportunity to proactively plan and develop recycling processes for a sustainable system.

An aspect of the invention described herein provides a method for recycling All solid state batteries (ASSBs), the method including: receiving a recycling stream of ASSBs comprising an electrolyte comingled with at least one charge material; introducing a passivating substance for neutralizing an undesired reaction or discharge of the charge materials from the batteries defining the recycling stream; agitating the batteries in the recycling stream in the presence of the passivating substance for liberating the charge materials and electrolyte stored therein; and recovering the charge material and the electrolyte from the agitated batteries, and wherein the passivating substance combines with the agitated batteries for generating a beneficial product thereby recycling ASSBs.

In an embodiment of the method, the batteries include: a metal-based anode, a cathode and a solid-state electrolyte (SSE). In an embodiment of the method, the metal anode is reactive in a non-inert environment. In an embodiment of the method, the passivating substance mitigates harmful reaction with the metal anode and is involved in a beneficial reaction for producing the beneficial product. In an embodiment of the method, the solid-state electrolyte is a lithium metal.

An embodiment of the method further includes prior to introducing, sorting the recycling stream of ASSBs based on type solid-state electrolyte. In an embodiment of the method, the passivating substance is at least one selected from: a reducing gas, and an inert gas. In an embodiment of the method, the reducing gas is at least one selected from: carbon dioxide, air, nitrogen, and hydrogen sulfide. In an embodiment of the method, the inert gas includes at least one of: helium, argon, neon, xenon, krypton, and radon.

In an embodiment of the method, the passivating substance includes air and argon. In an embodiment of the method, percentage of the reducing gas in the passivating substance is at least 99%, or at least 95%, or at least 90%, or at least 85%, or at least 80%, or at least 75%, or at least 70%. In an embodiment of the method, percentage of the inert gas in the passivating substance is at least 1%, or at least 5%, or at least 10%, or at least 15%, or at least 20%, or at least 25%, or at least 30%.

An embodiment of the method further includes after agitating, sieving the charge materials and beneficial product. An embodiment of the method further includes after sieving, washing the beneficial product with water to dissolve the beneficial product and purifying the beneficial product. In an embodiment of the method, the ASSBs is in at least one form selected from: stacked, pouched, folded pouch, and cylindrical roll. In an embodiment of the method, the beneficial product obtained is at least one selected from: a lithium carbonate precursor, lithium nitride, lithium hydroxide, lithium carbonate, lithium oxalate, hydrogen, and lithium sulfide.

In an embodiment of the method, the batteries in the recycling stream have a chemistry based on NMC (nickel, manganese, cobalt) for a cathode material. An embodiment of the method, further including prior to agitating, puncturing the ASSBs and injecting the passivating substance. In an embodiment of the method, agitating further includes at least one of: shredding, hammering, and pulverizing. An embodiment of the method further includes separating the NMC and current collectors by at least one process selected from: eddy current, and froth flotation.

BRIEF DESCRIPTION OF DRAWINGS

FIG. 1A is a schematic drawing showing structure of conventional liquid electrolyte LIB containing porous graphite or silicon anode composite, liquid electrolyte and porous separator layer, and porous cathode composite. FIG. 1B is a schematic drawing showing structure of ASSB with dense graphite and Li metal anode, dense solid electrolyte later, and dense cathode and electrolyte composite.

FIG. 2A-FIG. 2E is a set of schematic drawings illustrating different recycling methods, processes involved, and challenges within each step with respect to applying those steps for ASSBs. FIG. 2A is a schematic drawing showing steps for method of mechanical separation. FIG. 2B is a schematic drawing showing steps for method of Pyrometallurgy.

FIG. 2C is a schematic drawing showing steps for method of hydrometallurgy. FIG. 2D is a schematic drawing showing steps for method of direct recycling by hydrothermal recycling.

FIG. 2E is a schematic drawing showing steps for method of direct recycling by dissolution or precipitation.

DETAILED DESCRIPTION

Figure 1A:
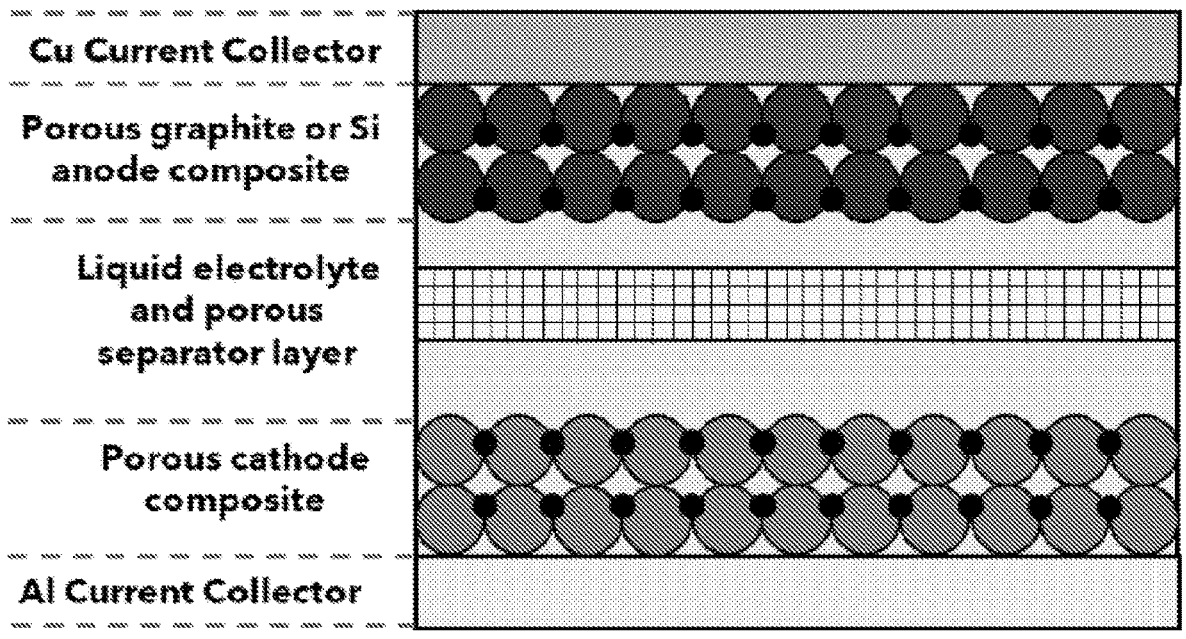
FIG. 1A-FIG. 1B is a set of schematic drawings illustrating structure of conventional batteries and ASSBs.

The methods and embodiments of method described herein demonstrate novel direct recycling processes for recycling ASSBs. Currently implemented recycling processes for conventional LIBs are discussed in terms of their viability toward different ASSB systems. A recycling process for All Solid State Batteries (ASSBs) receives a recycling stream of batteries having a Solid State Electrolyte (SSE) such as a ceramic electrolyte. In some embodiments a physical agitation occurs in the presence of a passivating substance neutralizes adverse reactions from charge materials and is selected to promote a reaction that yields a beneficial product for furthering the recycled value.

SSE Chemistries and Comparison with Conventional LIBs "Solid-state electrolytes" and "solid-state ionics" were first conceptualized with (3-alumina ($Na_2O \cdot 11Al_2O_3$) in Na—S batteries in the 1960s. For lithium-ion chemistries, LiI compounds found use in slow drain thin-film micro batteries. However, the limitations relating to power density, processing, and cost inhibited use in broader applications, and solid-state electrolytes for the most part were set aside for the superior electrochemical performance of liquid electrolyte-based systems that utilize $LiPF_6$ salts dissolved in organic solvents. Nevertheless, recent developments in solid-state electrolytes have led to a renewed interest in the field, with chemistries based on oxides, sulfides, and polymers, showing various forms of promise for the realization of a commercial ASSB.

Oxide-based SSEs, initially developed in the 1970s, can exist as either glassy/amorphous or crystalline forms. Glass-ceramic oxide compounds generally consist of $Li_2O-MO_x$, (M=Si, B, P, Ge, and so on), with a disordered structure of network-modifier oxides of $Li_2O$ and network-former oxides of $SiO_2$, $B_2O_3$, $P_2O_5$, $GeO_2$ and so on. $Li_xPO_yN_z$ (LiPON), developed in the 1990s, is also a glass-ceramic thin-film SSE with enhanced chemical stability against water and lithium metal, along with wider voltage windows. However, ionic conductivities of glass-ceramic/amorphous oxides remain quite low, with room temperature conductivities ranging from $10^{-6}$ to $10^{-9}$ S/cm. Recent interest in oxide SSEs focus on garnet-type and perovskite-type crystalline SSEs, ranging from $LiM_2(PO_4)_3$-type LISICON, to garnet-type LLZO, and perovskite-type LLTO. While these materials show much more promise with ionic conductivities of ~$10^{-3}$ S/cm and improved electrochemical and thermal stability, certain chemistries utilize rare elements, such as Ge, or expensive processing techniques. In addition, oxide-based SSEs can still suffer in long-term cycling stability due to mechanical brittleness or chemical incompatibility with other battery components, which then requires a separate interfacial layer between the electrolyte/electrode components.

Sulfide-based SSEs were initially developed in the 1980s with the $Li_2S$—$SiS_2$ system. The high ionic conductivities observed were attributed to the weaker bonding strength between sulfur and lithium allowing for more free moving lithium ions. Sulfide-type solid-state electrolytes can also be classified as glassy or crystalline, with Li—P—S-based chemistries such as $Li_6PS_5X$ (X=Cl, Br, or I) argyrodites, $Li_2S$—$P_2S_5$ thio-LISICONs, and $Li_{11-x}M_{2-x}P_{1+x}S_{12}$ (M=Ge, Sn, and Si) compounds. Of these, crystalline thio-LISICONs have exhibited high conductivities that rival those of liquid electrolytes and are of significant interest for research and development. Sulfide-based SSEs also allow for excellent and feasible cathode/electrolyte contact due to their mechanical pliability, as opposed to the relative hardness and brittleness of oxide-based SSEs. However, limitations revolve around the chemical instability of this SSE chemistry in ambient environments, posing possible durability and safety concerns in an ambient manufacturing or recycling environment.

Polymer and polymer/composite SSEs tend to be non-volatile, with excellent mechanical flexibility, processability, and compatibility with lithium metal. These SSEs typically involve a polymer host with lithium salt, such as LiTFSI, as a solid solvent. Lithium ions migrate from one coordination site to new sites along or between the polymer chains or jump from one chain to another chain under the effect of an electric field. While several types of polymer hosts can be utilized, polyethylene oxide (PEO) is the most widely used due to its maturity and leading electrochemical performance among other types of polymer-based SSEs. Polymer composites utilize the same polymer SSEs, but with ceramic fillers, such as $LiAlO_2$, $Al_2O_3$, and $SiO_2$, to improve ionic conductivity by reducing the glass transition temperature. Unfortunately, limitations in thermal stability, chemical compatibility with energy-dense positive electrodes, and lower oxidation voltages can severely limit polymer-based SSEs for use in common LIB cathode/anode pairs. While recent developments may continue to show promise for polymer-based SSEs, there is a bigger trend toward the development of sulfide- and oxide-based SSEs.

Architecture and Manufacture of ASSBs

The difference in cell architecture between an ASSB and conventional LIB is illustrated in FIG. 1. In an ASSB, the SSE acts as both in the form of a dense layer instead of having a liquid electrolyte and polymer separator, Further, SSE material must be mixed thoroughly within each electrode (except in the case of lithium metal anodes) for good contact with the active material to provide an ionically conductive network. For oxide-based SSEs, the active electrode and SSE materials are mixed and co-sintered to obtain good contact. For sulfide- and polymer-based SSEs, the contact is achieved via cold pressing due to the advantageous mechanical pliability of these materials.

anodes require the use of laser cutting processes, as lithium metal has significant adhesive properties that prohibit traditional cutting techniques.

A summary of components for conventional LIBs and ASSBs, as well as materials costs for conventional LIBs, is listed in Table 1. The materials cost for the liquid electrolyte in conventional LIBs is significantly higher compared to other major components on a per weight basis, being just as costly as some anode and cathode materials (although the actual weight fraction in a cell is much smaller). For an ASSB, the materials cost of SSEs can be even higher, such as for sulfide-based $Li_7P_3S_{11}$ at a cost of ~$50/kg. This cost is potentially even higher if the processing and overheads costs in manufacturing and integrating the electrolyte into cell fabrication are calculated.

SSEs typically find their end-of-life due to degradation mechanisms attributed to the solid electrolyte/electrode interface. Various mechanisms can occur, such as the devel-

TABLE 1

| Battery components for LIBs and ASSBs | | | |
|---|---|---|---|
| Component | Conventional LIB | All Solid State LIB | Materials costs |
| Anode current collector | Cu foil | Cu foil | $13/kg |
| Cathode current collector | Al foil | Al foil | $6/kg |
| Separator | Polyolefin | N/A | $1.4/m² |
| Cathode active material | NMC, LFP, LMO | NMC, LFP, LMO | $14-33/kg |
| Anode active material | Graphite, silicon | Graphite, silicon, Li metal | $19/kg (graphite) $25/kg (silicon) |
| Conductive additive | Carbon black | Carbon black | $7.15/kg |
| Binder | PVDF, other polymers | Oxide/polymer-SSE: PVDF, other polymer sulfide-SSE: NBR, other low-polarity polymers | $10-28/kg |
| Electrolyte | LiPF6 salt dissolved in organic solvents such as EC/EMC/DEC solutions | oxide-SSE: LLTO, LLZO, LISICON sulfide-SSE: LGPS, LPS, LPSX (X = Cl, I, Br) polymer-SSE: PEO based with oxide fillers | $12/kg (LiPF6 in organic solvent) $50/kg (sulfide-based SSE) |
| Form Factor | Prismatic, pouch, cylindrical | prismatic, pouch | N/A |

In addition to the different architecture and chemistries, in some embodiments ASSBs may also require different manufacturing processes compared with conventional LIBs. In conventional LIB assembly, anode and cathode films can be fabricated and coiled together in a roll-to-roll process along with a separator layer, followed by infiltration of the liquid electrolyte. The formation cycling/conditioning of the cell is required to develop a stable solid-electrolyte interphase layer on the anodes and cathodes. However, roll-to-roll processes are not particularly suitable for ASSBs, as a dense SSE layer must remain between the electrode layers, and may develop cracks or voids in a conventional roll-to-roll process.

Therefore, ASSBs are usually fabricated by cutting and stacking single sheets to make a cell stack. In some embodiments, bipolar plates in which the cathode material is coated on one side of the current collector and the anode material is coated on the other side are used. This form factor allows for higher energy density and restricts the form factor to prismatic and pouch cells. ASSBs that utilize lithium metal opment of a space charge layer, element interdiffusion, and electrochemical shock at active material/electrolyte interfaces. Cracks and voids can occur in the SSE layer due to cathode-related volume changes during electrochemical cycling and reduce the ionic conductivity of the cell. In addition, SSEs cannot completely mitigate the phenomena of Li dendrite formation, which can propagate along grain boundaries and cause internal shorts.

Potential Challenges of Recycling ASSBs Versus Conventional LIBs

Due to the significant differences in chemistry and structure of ASSBs compared with conventional LIBs, there are unique aspects to consider for recycling ASSBs. One of the main challenges is the separation of the SSE from the other cell components. In a conventional LIB, the liquid electrolyte can easily be washed away after cell teardown by using solvents, such as N-methyl-2-pyrrolidone. While there are some studies demonstrating recovery using supercritical $CO_2$ as a solvent, the separated liquid electrolyte in conventional LIB recycling is typically not recovered and is an irrecoverable loss. Because of the significant materials value, as shown in Table 1, a recycling system for ASSBs should be able to recover and regenerate the SSE in a practical manner. However, the intimate mixing and solid nature of the SSE prevents a feasible washing away method for oxide-based chemistries where the SSE and active cathode material are co-sintered. Sulfide-based and polymer-based SSEs, on the other hand, exhibit a potential solvent-based separation method. An effective recycling process must also consider handling an ASSB feedstock that may include different types of SSEs and cathodes, with the ability to separate and regenerate the materials in an appropriate manner.

While lithium metal anodes allow for higher cell energy density, these anodes can pose several issues for recycling if an individual cell within a module has an internal short and the module is disposed of with a significant amount of residual lithium metal. Lithium metal is well known to be adhesive and can cause issues with mechanical separation methods, such as shredding, crushing, or sieving. In addition, the reactivity of lithium metal poses a significant safety hazard, specifically in solution-based processes or other non-ideal environments, in which lithium may cause rapid exothermal reactions. Even conventional LIBs, which do not utilize lithium metal anodes, have historically posed safety risks due to their inherent reactivity; over the past decade, several accidents have occurred due to the storage of significant amounts of LIB waste. With the potential for even more reactive materials in disposed ASSBs, this safety hazard must be accounted for in designing recycling processes.

The SSE chemistry itself also poses stability or safety hazards and special processes or environments may be needed to handle SSEs. In particular, for sulfide-based SSEs, which are unstable in the presence of water/moist atmospheres, readily hydrolyzing and generating toxic $H_2S$ gas as a byproduct and posing significant safety hazards to human health. Oxide-based SSEs are much more stable in ambient conditions and can be handled with low health risks. However, they may still suffer some level of degradation from water exposure via possible $Li/H^+$ exchange and the formation of various Li salts on the surface from reactions between lattice lithium and $H_2O$ and $CO_2$ in the air. PEO polymer-based SSEs also exhibit a low level of risk, although PEO is very hygroscopic and can readily take in water. These concerns are significant during processes such as cell separation and solution-based processing and are discussed in the next section.

Types of Current Recycling Methods

Most current LIB recycling methods typically utilize a combination of mechanical separation, pyrometallurgical, and hydrometallurgical processes, which break down the battery components into different forms that are used to resynthesize new material. In hydrometallurgy and pyrometallurgy, the material is chemically broken down into other usable formats. Because of the more complex compositions, chemistries, form factors, and potentially more precious metals in an ASSB system, these traditional recycling processes are suitable and must take into account additional considerations. A summary of the steps in each recycling process and the challenges associated with ASSB recycling is shown in FIG. 2A-2E.

Mechanical separation of the battery packs and modules is often necessary as feedstock preparation for other recycling processes. The main purpose of this step is to separate major components using a combination of disassembly, shredding, crushing, and sieving. Due to the lack of standards in size and shape, particularly in EV and hybrid battery packs, cell disassembly is not widely utilized for large-scale processes and is set aside in favor of simpler shredding and sieving processes. Most of the current collectors and cell-casing materials are removed because of physical differences from electrode/electrolyte material, such as density, size, and malleability. Mild thermal treatments and washing steps with organic solvents are also often employed to remove organic binders and/or electrolytes. The process of mechanical separation results in a mix of cathode and anode powders, often referred to as "black mass," which is then further separated and processed using hydrometallurgy or direct recycling techniques.

While commonplace with conventional LIB recycling, ASSB systems will pose additional challenges to these traditional processes. Along with the mentioned issues concerning ASSBs with Li metal anodes, the pliability of sulfide- and polymer-based SSEs may also pose difficulties with separating black mass from the current collectors or passing through mesh filters. Further, cathodes and anodes are typically composed of micron-sized particles held together by binders, but electrodes utilizing oxide-based SSEs require sintered contacts, as well as a dense sintered layer between the two electrodes. Therefore, it is impractical to physically separate cathode material from SSE material, in addition to exacerbating tooling damage during shredding/crushing processes due to the hardness of these ceramic powders.

The pyrometallurgical method involves using high-temperature furnaces to smelt metal oxide from spent LIBs to an alloy of Co, Cu, Fe, and Ni, which originate from a combination of the cathode, cell casings, and current collectors. A significant advantage in ASSB recycling is that no sorting or pre-treatment steps are required as entire battery packs and modules can be used directly as feedstock. Concerns of worker safety and reactivity are minimal because the high furnace temperatures of this process break down potential hazards, as well as the use of smokestacks to funnel gases away from work environments. The commercialization of this technique lies in the simplicity and maturity of the science, and Umicore and other companies have used pyrometallurgy to successfully recycle high-value metals.

However, the high smelting temperature required for this technique incurs significant energy costs. While the oxidation of carbon additives, graphite anodes, and other materials can supply a significant portion of the process energy, this also results in irrecoverable losses of these components as well as the production of significant amounts of $CO_2$. In addition, Mn, Li, and Al are usually oxidized during smelting and are removed as part of the slag, further reducing the potential recovery yield. Polymer- and sulfide-based SSEs would be burned off or become part of the slag and could not be recovered with this method, with sulfide-based SSEs potentially producing toxic gases as a byproduct that would need to be scrubbed before release into the atmosphere. For oxide-based SSEs, valuable metals, such as La, Zr, Ti, and Ge, will become part of the smelted alloy or slag and will pose difficulty to separate for cathode and SSE production. It is also not an optimized recycling system, as significant energy is used to recover alloys, which is then required to be broken down and synthesized into battery components via methods, such as hydrometallurgy and chemical precipitation processes, involving additional energy, time, and materials input cost. Finally, this method typically has a rather low recovery rate and is usually economically viable by focusing on recovering valuable metals, such as cobalt, which is not sustainable because next-generation cathodes aim to reduce cobalt fractions.

Hydrometallurgy is a wet chemistry-based method that includes chemically breaking down and dissolving metal compounds into solution by acid-base leaching, purifying, and enriching various useful metals contained in the solution, and finally precipitating desired materials using an appropriate counter anion, such as carbonates, oxalates, or hydroxides. It exhibits the potential to recycle most LIB components at high recovery rates of >90%, regenerate high-purity materials, handle different cathode chemistries, and has low-energy costs and gas emissions. To increase the reaction rate of acid-base leaching, the discarded LIBs are typically mechanically separated and sieved to remove cell casings and current collector material. The resulting black mass is then heated to burn off residual organic solvents and binders, followed by dispersion in a solution, such as sulfuric acid and hydrogen peroxide, in which the cathode material will be dissolved while the more chemically stable carbon material will be separated as a filter cake and can be collected and regenerated separately. This process is not as mature as pyrometallurgy, and there have been continued improvements with modifications on leaching agents, extraction processes, and regeneration methods. A significant advantage of hydrometallurgical recycling is that high-purity $LiNi_xMn_yCo_zO_2$ (NMC) compounds and SSE material with proper morphologies can be selectively co-precipitated through a process of adjusting pH and tuning complexing and precipitating agents. The precipitation of desired compositions can also be achieved using a combination of inductively coupled plasma (ICP) measurements and the addition of select transition metal salts to modify the reactor solution to targeted compositions, allowing for a feedstock that is effectively tolerant of different NMC or oxide-based SSE chemistries.

Hydrometallurgical processes can recycle most LIB constituents to regenerate high-purity materials with high recovery rate, low-energy cost, and $CO_2$ emissions. However, the process is complicated and expensive especially factoring in materials input costs, and significant amounts of hazardous waste solutions that is generated. Hydrometallurgical methods may also not be suitable for certain ASSB systems. Highly reactive Li metal can react violently in the leaching solution if not pretreated beforehand. In addition, sulfide-based SSEs cannot be dispersed in water due to their instability and resulting production of toxic $H_2S$ gas. Polymer-based SSEs may have some solubility in the aqueous acid solution but can significantly alter the viscosity of the reactor solution even in small concentrations, potentially negatively affecting co-precipitation processes, and an effective form of recovery/separation of PEO and LiTFSI from solution is unlikely.

Oxide-based SSEs and the transition metal oxide cathodes are similar in chemistry, making the selective precipitation of NMC or SSE compounds possible with careful selection of counter anions and reactor conditions. It has been demonstrated that, through careful tuning of temperature, pH, and utilizing certain extractants, such as Na-Cyanex-272 and Na-D2EHPA, nickel, cobalt, and manganese can be successfully separated in sulfate solution. It is likely that additional fine-tuning of reactor conditions and the utilization of specialized extractants (such as Cyanex-572 designed for rare earth elements) can allow for the selective separation and precipitation of SSE-related compounds from cathode-related compounds, as well any metal oxide coating compounds commonly used to inhibit electrolyte/cathode reactions. In addition, metal hydroxides of commonly used elements for oxide-based SSEs, such as lanthanum, zirconium, and titanium, exhibit $K_{sp}$ values of several orders of magnitude lower than that of nickel, manganese, and cobalt. This significant difference in solubility can also be utilized for selective precipitation of SSE material from cathode material, although chelation agents and extractants may still be required to obtain desired morphologies. While hydrometallurgy has strong advantages in recycling traditional cathode and anode compounds, the complexities of SSE chemistries and combined cathode/SSE mixtures are significant obstacles toward the recycling of ASSBs.

A direct recycling process for ASSBs involves regenerating or recycling material without having to chemically break down and resynthesize battery components. As such, an ideal direct recycling system incurs lower-energy costs than conventional recycling by avoiding the materials and/or high-energy inputs to break down and release the stored energy in NMC or SSE compounds. An existing study utilizing the EverBatt model for $LiCoO_2$ demonstrated that direct recycling methods requires a fraction of the energy while generating far less greenhouse gas emissions than hydrometallurgical and pyrometallurgical methods, when considering both materials input and processing, at ~5 $MJ/kg_{cathode}$ and ~0.6 $kg_{CO2eq}/kg_{cathode}$, respectively. In comparison, hydrometallurgical and pyrometallurgical methods require ~31 and ~19 $MJ/kg_{cathode}$, while generating ~2.3 and ~2.5 $kg_{CO2eq}/kg_{cathode}$, respectively. From an economic viewpoint, the development of direct recycling methods may be critical for ASSB recycling to achieve economic viability.

Therefore, direct recycling can have the advantages of low energy costs combined with environmental friendliness. Aged or degraded material can be regenerated to a pristine state and, depending on the process, one can achieve a relatively straightforward and simple process of converting received material into components ready for new electrode fabrication. The main steps in direct recycling involve a re-lithiation process in which lithium-depleted cathode material reacts with a lithium source to recover its original stoichiometry, followed by or in conjunction with heat treatment to recover surface structure and morphology. The addition of an SSE may add complexity to this process, as traditional liquid electrolytes would typically be washed away before cathode regeneration.

In hydrothermal regeneration, depleted cathode materials, such as NMC, LCO, or LMO, are dispersed in an aqueous solution of lithium salts, such as LiGH or $Li_2SO_4$, and sealed in a chemically inert container such as Teflon and heated to between 100° C. and 200° C. for several hours. This is usually followed by washing, filtration, and a brief heat-treatment step to recover surface characteristics. This method allows for the regeneration of cathode powders at different levels of lithium depletion, a significant advantage over traditional solid-state regeneration in which chemical composition must be analyzed from batch to batch to determine the amount of additional lithium salts required. In addition, certain solid-state electrolytes have been successfully synthesized using hydrothermal methods, such as $Li_{1+x}Al_xTi_{2-x}(PO_4)$. While there are only a few studies utilizing hydrothermal methods regarding solid-state electrolytes, regeneration via this method can possible due to the similarity in chemistry and proof-of-concept with oxide-based cathodes. In particular, this could be especially advantageous in a processing perspective, where intimately mixed or co-sintered cathode-electrolyte powders do not require full separation for regeneration. The subsequent heat-treatment step can function both as a surface recovery step and for reestablishing sintered contact between cathode and electrolyte particles.

Sulfide-based SSEs that utilize $PS_4^{3-}$ thiophosphates are readily solvated in polar solvents. Subsequently, there have been implications that a dissolution/precipitation method could be utilized as an effective recycling method for sulfide-based ASSBs. Cheap and safe solvents, such as ethanol or acetonitrile, can be used to dissolve and filter the sulfide-based SSEs from the rest of the cell components. These solvents are non-reactive with traditional cathodes and anodes, and the dissolution processes occur without chemical degradation of the SSEs, which can be successfully dissolved and recrystallized back into crystalline forms for reuse in ASSBs. The insoluble cathode and anode powders can be processed and regenerated separately, while the polar solvent solution allows for SSE recovery by evaporation and collection of the low-vapor-pressure solvents. This is typically followed by mild heat treatment of the precipitated SSE material to improve conductivity by increasing grain size, followed by reprocessing into dense SSE films or use in electrode fabrication. This low-energy-intensive process could overall generate very minimal amounts of waste while having a high recovery yield.

Certain polymer-based SSEs may also find use in recycling and recovery using dissolution/precipitation methods. PEO is a well-studied material and is soluble in water and some polar solvents, such as acetonitrile. This is a significant advantage in the fabrication of polymer-based SSEs but can also allow for an effective method of separating PEO-based SSEs from the rest of the cell components or black mass. Commonly used lithium salts, such as LiTFSI are also soluble in water, potentially permitting for a safe and cost-effective method of SSE recycling. Some studies have also demonstrated full solubility and dissolution of PEO into monomers within 30 min of water immersion without the need for agitation. The monomers and Li salts can then be recovered back into the SSE/polymer networks by removal of water under heating.

Design and Requirements for ASSB Recycling

Figure 3:
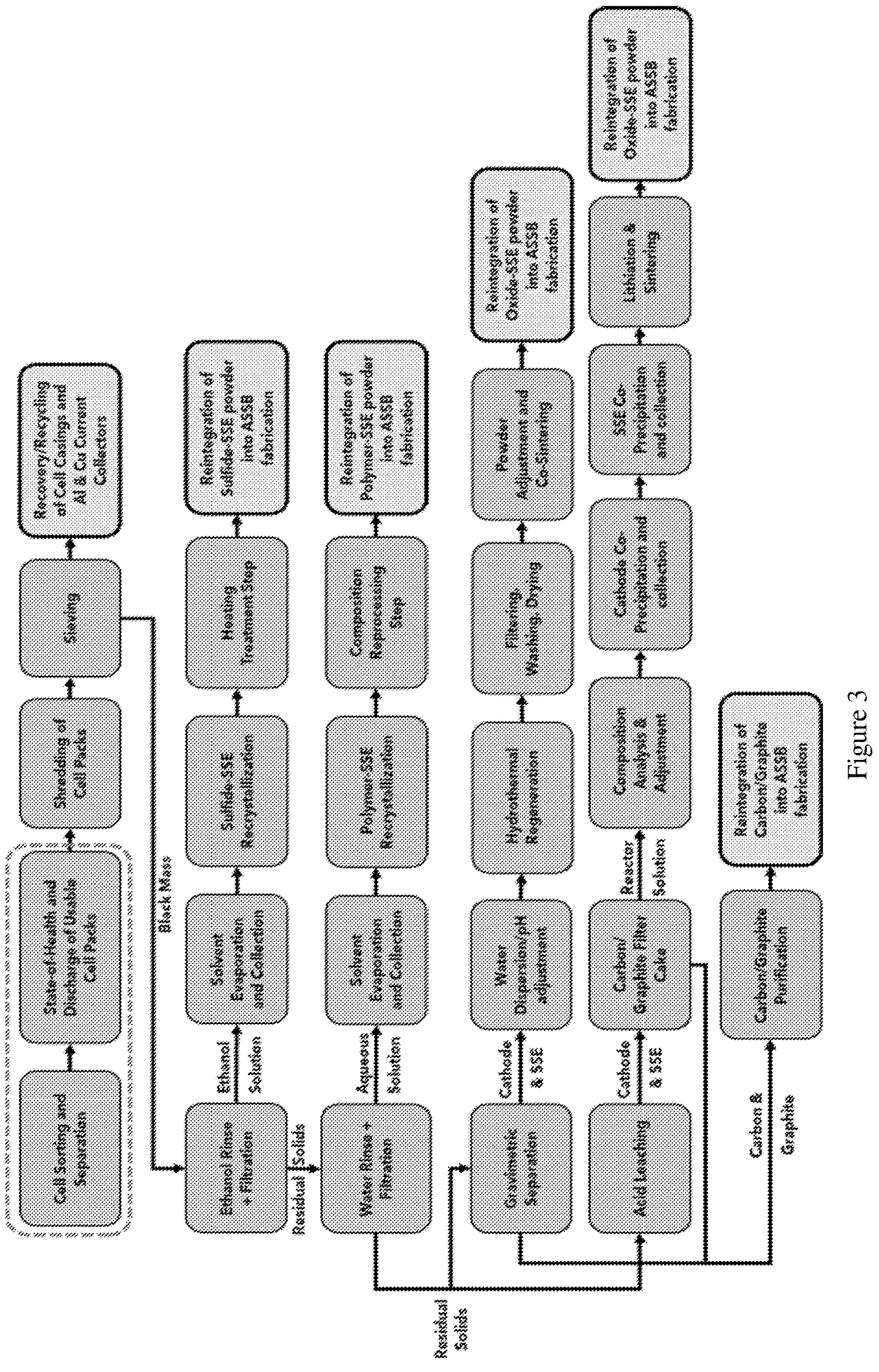
FIG. 3 is a schematic drawing showing a process flow of an ASSB recycling system that utilizes hydrometallurgy and direct recycling methods.

In the schematic of the process flow shown in FIG. 3, the inventors envision an embodiment of a method for the recycling of ASSBs, taking into consideration cell pack form, safety requirements, and processability of different ASSB systems. In the first step, cell packs are separated based on internal chemistry and examined for state of health before being discharged completely to recover any electrical work as well as minimize amount of residual lithium or other reactive components. In a situation in which this is not feasible, cell pack disassembly is conducted in a dry carbon dioxide-rich environment (<4% oxygen), utilizing automated processes for shredding and/or crushing of the cell packs. The human workers are protected from being exposed to hazardous conditions, the reactivity of the disassembled cell components is inhibited by the absence of moisture, preventing $H_2S$ gas formation from sulfide-based SSEs while converting residual lithium metal to stable lithium carbonate compounds via reactions with $CO_2$. Subsequent sieving allows for the separation of the outer cell pack components and/or current collectors, which is recycled or disposed of using conventional methods.

The resulting anode, cathode, and SSE powders are then dispersed and washed thoroughly in a polar solvent, such as ethanol, to first dissolve sulfide-based SSEs, followed by filtration to separate the insoluble components from the solution. The solution is collected and evaporated to recrystallize sulfide SSE material, heat treated to improve micro-structure, and reintroduced into new ASSB fabrication. To separate potential PEO-based polymer SSEs, an additional washing step is performed using water or water/alcohol mixtures above 50° C. due to the viscosity of PEO solutions. This solution would ideally contain PEO monomers and Li salts (LiTFSI), which is transformed back into SSEs via heating and removal of solvents. The insoluble components are separated and treated using hydrothermal or hydrometallurgical methods.

For a hydrothermal regeneration process, it would be suitable to first separate any graphite or carbon black from the solid mixture using a form of gravimetric separation. Subsequently, the remaining cathode-SSE solids are dispersed into an aqueous solution. Any residual lithium carbonate from the previous lithium metal reaction would also be soluble and contribute to the lithium salt aqueous solution needed for hydrothermal regeneration, with the ability to utilize pH measurements to determine the lithium concentration in solution and meet a consistency by adding lithium salts. Following hydrothermal regeneration, the powder batch is measured for chemical composition, and additional cathode or SSE powder is added to reach a targeted cathode/electrolyte ratio. To recover surface morphology and establish cathode/SSE particle contacts the powder batch is co-sintered, followed by integration into new ASSB fabrication.

If the feedstock is known to contain cathodes or oxide-based SSEs of a variety of compositions, it would be suitable to utilize hydrometallurgical processes. The solids mixture are dispersed in an acid leaching solution, with the inert graphite and carbon black being separated as filter cake. ICP analysis and additional transition metal salts are needed to obtain targeted NMC and SSE compositions in solution. These steps are followed by carefully controlled processes and selective counter anions, chelation agents, and extractants to separately precipitate and collect NMC precursor compounds, followed by precipitation and collection of SSE compounds and possible coating compounds. The NMC and SSE materials are separately lithiated/heat treated using solid-state methods and reintegrated into new ASSB fabrication.

In an embodiment of the method, recycling process for All Solid State Batteries (ASSBs) receives a recycling stream of batteries having a Solid State Electrolyte (SSE) such as a ceramic electrolyte. A physical agitation occurs in the presence of a passivating substance that neutralizes adverse reactions from charge materials and is selected to promote a reaction that yields a beneficial product for furthering the recycled value.

Embodiments of the methods described herein are based, in part, on the observation that solid state electrolyte is gaining popularity over conventional liquid electrolyte because of safety in avoiding runaway discharging that can lead to undetected fires. Unfortunately, conventional approaches suffer from the shortcoming that the SSE charge materials are often employed with metal anodes such as lithium metal or silicon metal, which can be volatile when dismantled in an oxygen atmosphere. Accordingly, configurations herein substantially overcome the shortcoming of conventional approaches by providing a passivating substance that not only prevents harmful open-air reactions of lithium metal anode materials, but rather results in a beneficial product from reactions with the liberated lithium metal anode material.

Figure 1B:
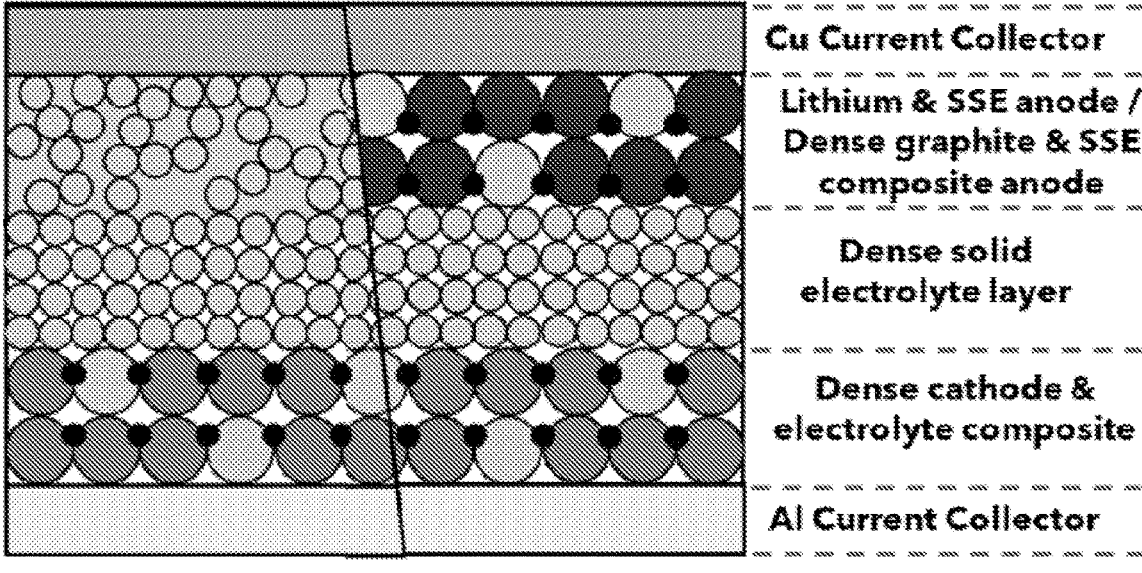

The difference in cell architecture between an ASSB and conventional lithium ion batteries is illustrated in FIG. 1A and FIG. 1B, in which, instead of a liquid electrolyte and polymer separator, the SSE acts as both in the form of a dense layer. In addition, SSE material must be mixed thoroughly within each electrode (except in the case of lithium metal anodes) for good contact with the active material to provide an ionically conductive network. In the case of oxide-based SSEs, this typically requires mixing and co-sintering of the active electrode and SSE materials. For sulfide- and polymer-based SSEs, this contact is achieved via cold pressing due to the advantageous mechanical pliability of these materials.

As illustrated in FIG. 1B, the solid electrolyte material is comingled with the charge material, forming a dense agglomeration of pure electrolyte rather than a discrete layer of a separator material as in FIG. 1A. Any residual charge remaining in the ASSB cells can be liberated suddenly when physically dismantled concurrently with the conductive current collectors. A passivating substance neutralizes this electrochemical reaction and leverages it to define a beneficial product.

In embodiments described herein, a method for recycling solid state batteries includes receiving a recycling stream of secondary batteries including a solid state electrolyte (SSE) comingled with the charge material, as illustrated in FIG. 1B. The recycling process introduces a passivating substance, such as a gaseous environment, for neutralizing an undesired reaction or discharge of charge materials from the batteries defining the recycling stream. Therefore, the ASSBs do not have to be manually discharged prior to recycling, as the state of batteries entering the recycling stream is unknown. A mechanical process agitates the batteries in the recycling stream for liberating the charge materials and electrolyte stored therein. The mechanical process includes a variety of physical interventions, such as physical shedding, hammering or pulverizing of a battery containment, current collectors and charge material. Further treatment includes separating the Nickel, Manganese, and Cobalt (NMC) and current collectors by at least one of eddy current and froth flotation resulting in a granular or powdery substance defining the charge material and solid electrolyte.

The recycling process includes recovering the charge material and the electrolyte from the agitated batteries, such that the passivating substance combines with the agitated batteries for generating a beneficial product. In contrast, conventional liquid electrolytes are often dissolved and lost by leaching of the charge materials, along with much of the lithium.

In some embodiments, batteries include a metal anode, in which the metal anode is reactive in a non-inert environment, and the passivating substance mitigates harmful reaction with anode metal and is involved in a beneficial reaction for producing an output product. The output product varies and is based on a gaseous reaction with the anode material in the charge material. Silicon metal and lithium metal are often employed as anode charge material, however lithium metal has improved storage capacity, and is more reactive in an uncontrolled (oxygenated) atmosphere. In some embodiments, lithium metal is coated with a conductive polymer.

In some embodiments, the solid-state electrolyte is an organic electrolyte or a polymer gel electrolyte (sticky polymer electrolyte), an aqueous electrolyte, or a ceramic electrolyte.

In some embodiments, the passivating substance includes $CO_2$, resulting in a lithium carbonate precursor including $Li_2C_2O_4$, which yields lithium carbonate upon heating. In another embodiment, the passivating substance is hydrogen sulfide resulting in a beneficial product including hydrogen and LiS. In some embodiments, the passivating substance includes an appropriate inert gas, such that the beneficial product is lithium hydroxide.

In some embodiments, the batteries in the recycling stream have a chemistry based on NMC (nickel, manganese, cobalt) for a cathode material, however other suitable battery chemistries may be employed in other embodiments of the method. The passivating substance is selected based on the charge material, and particularly an anodic metal charge material, employed for use with the SSE. In some embodiments, the passivating substance is a mixture of a reducing gas and an inert gas. In other embodiments, the passivating substance is a fire suppression gas.

In some embodiments of the method, the ASSBs are punctured in a $CO_2$ rich environment thereby passivating the highly reactive lithium metal. The ASSBs are then safe for mechanical disassembly in for example, a hammermill, shear shredder, roll crusher or similar equipment. The passivating reaction is as follows:

$$Li+CO_2=Li_2C_2O_4$$

$$Li_2C_2O_4+High\ T=Li_2CO_3+CO$$

In alternative embodiments, instead of puncturing the ASSBs in a $CO_2$ rich environment, $CO_2$ gas is injected directly into the cells. In some embodiments of the method, modules or pouches or packs are directly shredded in presence of $CO_2$ gas. In some embodiments, the $CO_2$ rich environment includes argon or another inert gas. In some embodiments, the pressure of the passivating substance is maintained at ambient pressure or 1 atm. In some embodiments, the passivating substance is a shielding gas.

In some embodiments, the ASSBs are punctured in a $H_2S$ rich environment to obtain lithium sulfide. The reaction is $Li+H_2S=LiS+H_2$. In alternative embodiments, the $H_2S$ gas is injected directly into the ASSBs. In other embodiments, modules or packs are shredded in presence of $H_2S$ gas. In some embodiments, the batteries including cells, modules, and packs are cooled to below $0°$ C. and shredded in an inert atmosphere for example, in presence of helium, argon, neon, xenon, krypton, radon, $CO_2$ or $H_2S$.

In some embodiments, the shredding equipment for example a hammermill, a shear shredder, a roll crusher, etc. is maintained at or below $0°$ C. during shredding.

To separate NMC cathode materials and foils from ceramic separator and lithium metal or compounds the batteries are shear shredded or roll crushed. In alternative embodiments, NMC and aluminum are separated from anode materials by eddy current. In alternative embodiments, NMC and aluminum are separated from anode materials by froth floatation.

The shredded material (the black mass) is sieved in inert atmosphere or in presence of mineral oil to enable lithium metal recovery. Upon sieving, the black mass includes cathode powder, salt from the metal based anode, and solid electrolyte materials. The solid electrolyte material for example, sulfide, polymer, etc. is selectively dissolved in appropriate solvents to obtain cathode materials. In some embodiments, the lithium based anode compounds, for example, lithium hydroxide, lithium carbonate, lithium sulfide, lithium sulfate, etc. are washed with cold water to dissolve lithium ions. The lithium solution is then filtered, purified, and crystalized as a lithium salt. The solid electrolyte materials go through hydrometallurgical process to recover salt, precursor or cathode materials. If solid electrolyte materials for example oxide are not dissolvable, then both solid electrolyte and cathode materials are leached into the acid solution.

For dissolved cathode material with or without solid electrolyte, separation based on different solubility, pH, etc. is conducted to remove solid electrolyte elements in the leaching solution to obtain a solution including Ni ions, Mn ions, Co ions, Li ions and/or Na ions. The purified solution is subjected to solvent extraction to separate different elements or directly synthesize NMC precursors after adjusting the ratio of different elements. In some embodiments, the lithium recovered by the recycling method described herein is at least 80%.

A portion of the embodiments described herein were published in Matter (2020) as "Recycling for All Solid-State Lithium-Ion Batteries" by co-authors, Luqman Azhari, Sungyool Bong, Xiaotu Ma, and Yan Wang.

The inventions described herein are the most practical methods. It is recognized, however, that departures may be made within the scope of the invention and that modifications will occur to a person skilled in the art. With respect to the above description then, it is to be realized that the optimum dimensional relationships for the parts of the invention, to include variations in size, materials, shape, form, function, steps, and manner of operation, assembly and use, would be apparent to one skilled in the art, and all equivalent relationships to those illustrated in the drawings and described in the specification are intended to be encompassed by the present inventions.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Such equivalents are within the scope of the present invention and claims. The contents of all references including issued patents and published patent applications cited in this application are hereby incorporated by reference.

The invention now having been fully described, it is further exemplified by the following claims.

What is claimed is:

1. A method for recycling All solid state batteries (ASSBs), the method comprising:
   receiving a recycling stream of ASSBs comprising an electrolyte comingled with at least one charge material;
   introducing a passivating substance for neutralizing an undesired reaction or discharge of the charge materials from the batteries defining the recycling stream;
   agitating the batteries in the recycling stream in the presence of the passivating substance for liberating the charge materials and electrolyte stored therein, further comprising prior to agitating, puncturing the ASSBs and injecting the passivating substance; and
   recovering the charge material and the electrolyte from the agitated batteries, and wherein the passivating substance combines with the agitated batteries for generating a beneficial product thereby recycling ASSBs.

2. The method according to claim 1, wherein the batteries further comprise a metal-based anode and a cathode.

3. The method according to claim 2, wherein the metal-based anode is reactive in a non-inert environment.

4. The method according to claim 2, wherein the passivating substance mitigates harmful reaction with the metal-based anode and is involved in a beneficial reaction for producing the beneficial product.

5. The method according to claim 2, wherein the solid-state electrolyte is a lithium metal.

6. The method according to claim 1, further comprising prior to introducing, sorting the recycling stream of ASSBs based on a type of solid-state electrolyte.

7. The method according to claim 1, wherein the passivating substance is at least one selected from: a reducing gas, and an inert gas.

8. The method according to claim 7, wherein the reducing gas is at least one selected from: carbon dioxide, air, nitrogen, and hydrogen sulfide.

9. The method according to claim 7, wherein the inert gas comprises at least one of: helium, argon, neon, xenon, krypton, and radon.

10. The method according to claim 9, wherein the passivating substance comprises air and argon.

11. The method according to claim 8, wherein a percentage of the reducing gas in the passivating substance is at least 99%, or at least 95%, or at least 90%, or at least 85%, or at least 80%, or at least 75%, or at least 70%.

12. The method according to claim 9, wherein a percentage of the inert gas in the passivating substance is at least 1%, or at least 5%, or at least 10%, or at least 15%, or at least 20%, or at least 25%, or at least 30%.

13. The method according to claim 1 further comprising after agitating, sieving the charge materials and beneficial product.

14. The method according to claim 13 further comprising after sieving, washing the beneficial product with water to dissolve the beneficial product and purifying the beneficial product.

15. The method according to claim 1, wherein the ASSBs is in at least one form selected from: stacked, pouched, folded pouch, and cylindrical roll.

16. The method according to claim 1, wherein the beneficial product obtained is at least one selected from: a lithium carbonate precursor, lithium nitride, lithium hydroxide, lithium carbonate, lithium oxalate, hydrogen, and lithium sulfide.

17. The method according to claim 1, wherein the batteries in the recycling stream have a chemistry based on NMC (nickel, manganese, cobalt) for a cathode material.

18. The method according to claim 1, wherein agitating further comprises at least one of: shredding, hammering, and pulverizing.

19. The method according to claim 17, further comprising separating the NMC and current collectors by at least one process selected from: eddy current, and froth flotation.

* * * * *